US012755667B2

(12) United States Patent
Lim et al.

(10) Patent No.: US 12,755,667 B2
(45) Date of Patent: Oct. 6, 2026

(54) SYSTEMS AND METHODS FOR COMPENSATING FOR SCAN SIGNAL INDUCED ODD-EVEN ROW MISMATCH

(71) Applicant: Apple Inc., Cupertino, CA (US)

(72) Inventors: Jongyup Lim, San Jose, CA (US); Jie Won Ryu, San Jose, CA (US); Feng Wen, Santa Clara, CA (US); Zhizhen Ma, Santa Clara, CA (US); Kingsuk Brahma, Mountain View, CA (US); Hyunwoo Nho, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 19/044,279

(22) Filed: Feb. 3, 2025

(65) Prior Publication Data

US 2025/0292718 A1 Sep. 18, 2025

Related U.S. Application Data

(60) Provisional application No. 63/565,401, filed on Mar. 14, 2024.

(51) Int. Cl.

*G09G 3/20* (2006.01)
*G09G 3/3233* (2016.01)

(52) U.S. Cl.

CPC ......... *G09G 3/2074* (2013.01); *G09G 3/3233* (2013.01); *G09G 2300/0804* (2013.01);
(Continued)

(58) Field of Classification Search

CPC ............... G09G 3/2074; G09G 3/3233; G09G 2300/0804; G09G 2300/0819;
(Continued)

(56) References Cited

U.S. PATENT DOCUMENTS 5,715,376 A * 2/1998 Nakayama ........... H04N 1/6025 358/1.9
9,111,481 B2 8/2015 Ono
(Continued)

FOREIGN PATENT DOCUMENTS

CN 106354292 A 1/2017
CN 117475857 A 1/2024
(Continued)

*Primary Examiner* — Antonio Xavier
(74) *Attorney, Agent, or Firm* — Fletcher Yoder, P.C.

(57) ABSTRACT

Display pixels of an electronic display may exhibit front-of-screen distortions when high spatial frequency image data is applied on the electronic display panel. The high spatial frequency may generate voltage ripple on a storage capacitor of pixel driving circuitry, causing mismatch between luminance of a first subpixel on an odd-numbered row and a corresponding subpixel on an even-numbered row. This odd-even row mismatch may be compensated via mismatch compensation circuitry. The mismatch compensation circuitry may include an odd subpixel compensation LUT and an even subpixel compensation LUT. The odd subpixel compensation LUT may output odd subpixel compensation values and the even subpixel compensation LUT may output even subpixel compensation values. The multiplexer may combine the odd subpixel compensation values and the even subpixel compensation values with input image data to generate compensated subpixel data, which may reduce or eliminate the odd-even row mismatch.

20 Claims, 8 Drawing Sheets

(52) U.S. Cl.
CPC ............... *G09G 2300/0819* (2013.01); *G09G 2300/0842* (2013.01); *G09G 2310/0205* (2013.01); *G09G 2320/0233* (2013.01); *G09G 2320/0666* (2013.01); *G09G 2360/16* (2013.01)

(58) Field of Classification Search
CPC ... G09G 2300/0842; G09G 2310/0205; G09G 2320/0233; G09G 2320/0666; G09G 2360/16
See application file for complete search history.

(56) References Cited

U.S. PATENT DOCUMENTS

| | | | | | |
|---|---|---|---|---|---|
| 9,368,085 | B2 | 6/2016 | Li | | |
| 9,905,152 | B2 | 2/2018 | Sang | | |
| 11,837,175 | B2 | 12/2023 | Lim | | |
| 2007/0195040 | A1* | 8/2007 | Park | G09G 3/3648 | 345/89 |
| 2008/0316163 | A1* | 12/2008 | Van Den Homberg | G09G 3/3685 | 345/98 |
| 2013/0305199 | A1* | 11/2013 | He | G06F 30/327 | 716/104 |
| 2014/0198087 | A1* | 7/2014 | Knausz | G06F 3/04184 | 345/212 |
| 2015/0194119 | A1 | 7/2015 | Ahn | | |
| 2018/0026583 | A1* | 1/2018 | Yanduru | H03F 3/195 | 330/289 |
| 2018/0315383 | A1 | 11/2018 | Shimoshikiryoh | | |
| 2020/0143750 | A1* | 5/2020 | Gao | H10K 59/121 | |
| 2024/0046874 | A1* | 2/2024 | Bai | G09G 3/3233 | |
| 2024/0127743 | A1* | 4/2024 | Moon | G09G 3/32 | |

FOREIGN PATENT DOCUMENTS

| | | | |
|---|---|---|---|
| JP | 2003186439 | A | 7/2003 |
| KR | 496884 | B1 | 6/2005 |

* cited by examiner

SYSTEMS AND METHODS FOR COMPENSATING FOR SCAN SIGNAL INDUCED ODD-EVEN ROW MISMATCH

CROSS-REFERENCE TO RELATED APPLICATIONS

This application claims priority to U.S. Provisional Application No. 63/565,401, filed Mar. 14, 2024, which is incorporated by reference herein in its entirety.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Display pixels of an electronic display may exhibit front-of-screen distortions—such as distorted luminance and/or color—when high spatial frequency image data is applied on the electronic display panel. The high spatial frequency may cause mismatch between luminance of a first subpixel on an odd-numbered row (odd subpixel) and a corresponding subpixel on an even-numbered row (even subpixel). Specifically, when subpixels are driven by scan signals (including 2H (2× line time) scan signals) while input data is programmed line-by-line, the electronic display may exhibit luminance mismatch between the odd subpixels and the even subpixels, despite the odd subpixels and the even subpixels receiving the same input data.

Additionally or alternatively, non-idealities such as panel loading may cause a voltage ripple having a 2H period on the 2H scan signals. The voltage ripple of the 2H scan signal may be capacitively coupled and sampled to subpixels on odd and even rows at different timings, respectively, which may result in luminance mismatch between the odd subpixels and the even subpixels. To improve performance of the electronic display and enhance user experience, it may be beneficial to reduce the front-of-screen distortions due to the odd-even row mismatch and/or panel loading.

To resolve the aforementioned odd-even row mismatch, the odd-even row mismatch may be compensated via odd-even row mismatch compensation circuitry. In particular, a first mismatch compensation value may be loaded from an odd-row subpixel compensation lookup table (LUT) and a second mismatch compensation value may be loaded from an even-row subpixel compensation LUT. The odd-row subpixel compensation LUT and the even-row subpixel compensation LUT may receive the same input subpixel data value and may each receive display brightness value (DBV) information and a color type (e.g., red, green, and/or blue) pertaining to the input subpixel data value. A multiplexer may be coupled to the outputs of the odd-row subpixel compensation LUT and the even-row subpixel compensation LUT.

When the multiplexer selects the odd-row subpixel compensation LUT (e.g., based on a first enable signal), the odd-row subpixel compensation LUT may output an odd-row mismatch compensation value based on the present input subpixel data value and the DBV. The odd-row mismatch compensation value may be combined with the input subpixel data to generate a compensated odd-row input subpixel compensation value. Likewise, when the multiplexer selects the even-row subpixel compensation LUT (e.g., based on a second enable signal), the even-row subpixel compensation LUT may output an even-row mismatch compensation value based on the present input subpixel data value, the DBV, and the color type. The even-row mismatch compensation value may be combined with the input subpixel data value to produce a compensated even-row input subpixel data value. The compensated odd-row input subpixel data value and the compensated even-row input subpixel data value may be sequentially output from the electronic display to compensate for the voltage ripple of the 2H scan signal.

In some electronic displays, the impact of the voltage ripple on the 2H scan signal may vary based on the location of a subpixel relative to a voltage source. Accordingly, a subpixel location compensation LUT may store pre-loaded compensation values based on a subpixel's XY-coordinates on a display panel of the electronic display. Accordingly, in some embodiments, the compensated odd-row input subpixel data value and the compensated even-row input subpixel data value may be combined with a location-based scaler compensation value prior to being output to the electronic display. In this manner, the location-based scaler compensation value may be applied to accommodate subpixel location dependency of the panel loading.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
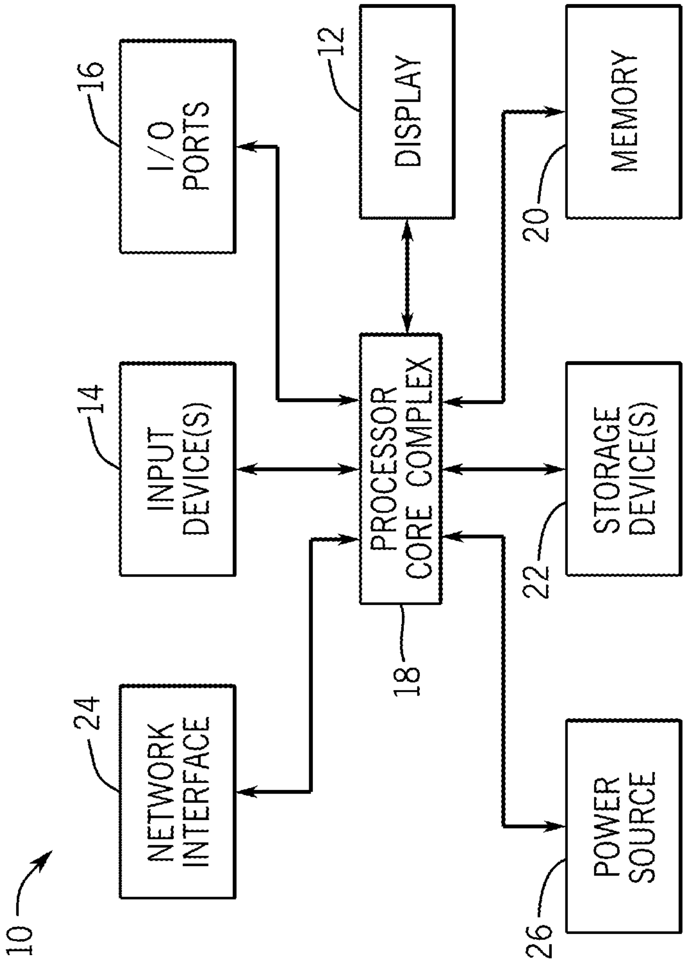
FIG. 1 is a block diagram of an electronic device that includes an electronic display, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "some embodiments," "embodiments," "one embodiment," or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Display pixels of an electronic display may exhibit front-of-screen distortions (e.g., distorted luminance and/or color) when high spatial frequency image data is applied on the electronic display panel. The high spatial frequency may cause a mismatch between luminance of a first subpixel on an odd-numbered row (referred to herein as an "odd subpixel") and a corresponding subpixel on an even-numbered row (referred to herein as an "even subpixel"). Specifically, when subpixels are driven by scan signals—including 2H (2× line time) scan signals—while input data is programmed line-by-line (e.g., row-by-row), the electronic display may exhibit luminance mismatch between the odd subpixels and the even subpixels, despite the odd subpixels and the even subpixels receiving the same input data.

Additionally or alternatively, non-idealities such as panel loading may cause voltage ripple having a 2H period on the 2H scan signals. The voltage ripple of the 2H scan signal may be capacitively coupled and sampled to subpixels on odd and even rows at different timings, respectively, which may result in luminance mismatch between the odd subpixels and the even subpixels.

To resolve the aforementioned odd-even row mismatch, the odd-even row mismatch may be compensated via odd-even row mismatch compensation circuitry. In particular, a first mismatch compensation value may be loaded from an odd-row subpixel compensation lookup table (LUT) and a second mismatch compensation value may be loaded from an even-row subpixel compensation LUT. The odd-row subpixel compensation LUT and the even-row subpixel compensation LUT may receive the same input subpixel data value and may each receive display brightness value (DBV) information and a color type (e.g., red, green, and/or blue) pertaining to the input subpixel data value. A multiplexer may be coupled to the outputs of the odd-row subpixel compensation LUT and the even-row subpixel compensation LUT.

When the multiplexer selects the odd-row subpixel compensation LUT (e.g., based on a first enable signal), the odd-row subpixel compensation LUT may output an odd-row mismatch compensation value based on the present input subpixel data value and the DBV. The odd-row mismatch compensation value may be combined with the input subpixel data to generate a compensated odd-row input subpixel compensation value. Likewise, when the multiplexer selects the even-row subpixel compensation LUT (e.g., based on a second enable signal), the even-row subpixel compensation LUT may output an even-row mismatch compensation value based on the present input subpixel data value and the DBV. The even-row mismatch compensation value may be combined with the input subpixel data value to produce a compensated even-row input subpixel data value. The compensated odd-row input subpixel data value and the compensated even-row input subpixel data value may be sequentially output from the electronic display to compensate for the voltage ripple of the 2H scan signal.

In some electronic displays, the impact of the voltage ripple on the 2H scan signal may vary based on the location of a subpixel relative to a voltage source. Accordingly, a subpixel location compensation LUT may store pre-loaded compensation values based on a subpixel's XY-coordinates on a display panel of the electronic display. Accordingly, in some embodiments, the compensated odd-row input subpixel data value and the compensated even-row input subpixel data value may be combined with a location-based scaler compensation value prior to being output to the electronic display. In this manner, the location-based scaler compensation value may be applied to accommodate subpixel location dependency of the panel loading.

With the foregoing in mind, FIG. 1 is an example electronic device 10 with an electronic display 12 having independently controlled color component illuminators (e.g., projectors, backlights). As described in more detail below, the electronic device 10 may be any suitable electronic device, such as a computer, a mobile phone, a portable media device, a tablet, a television, a virtual-reality headset, a wearable device such as a watch, a vehicle dashboard, or the like. Thus, it should be noted that FIG. 1 is merely one example of a particular implementation and is intended to illustrate the types of components that may be present in an electronic device 10.

The electronic device 10 may include one or more electronic displays 12, input devices 14, input/output (I/O) ports 16, a processor core complex 18 having one or more processors or processor cores, local memory 20, a main memory storage device 22, a network interface 24, a power source 26, and image processing circuitry. The various components described in FIG. 1 may include hardware elements (e.g., circuitry), software elements (e.g., a tangible, non-transitory computer-readable medium storing instructions), or a combination of both hardware and software elements. As should be appreciated, the various components may be combined into fewer components or separated into additional components. For example, the local memory 20 and the main memory storage device 22 may be included in a single component. Moreover, the image processing circuitry (e.g., a graphics processing unit, a display image processing pipeline) may be included in the processor core complex 18 or be implemented separately.

The processor core complex 18 is operably coupled with local memory 20 and the main memory storage device 22. Thus, the processor core complex 18 may execute instructions stored in local memory 20 or the main memory storage device 22 to perform operations, such as generating or transmitting image data to display on the electronic display 12. As such, the processor core complex 18 may include one or more general purpose microprocessors, one or more application specific integrated circuits (ASICs), one or more field programmable logic arrays (FPGAs), or any combination thereof.

In addition to program instructions, the local memory 20 or the main memory storage device 22 may store data to be processed by the processor core complex 18. Thus, the local memory 20 and/or the main memory storage device 22 may include one or more tangible, non-transitory, computer-readable media. For example, the local memory 20 may include random access memory (RAM) and the main memory storage device 22 may include read-only memory (ROM), rewritable non-volatile memory such as flash memory, hard drives, optical discs, or the like.

The network interface 24 may communicate data with another electronic device or a network. For example, the network interface 24 (e.g., a radio frequency system) may enable the electronic device 10 to communicatively couple to a personal area network (PAN), such as a BLUETOOTH® network, a local area network (LAN), such as an 802.11x Wi-Fi network, or a wide area network (WAN), such as a 4G, Long-Term Evolution (LTE), or 5G cellular network.

The power source 26 may provide electrical power to operate the processor core complex 18 and/or other components in the electronic device 10. Thus, the power source 26 may include any suitable source of energy, such as a rechargeable lithium polymer (Li-poly) battery and/or an alternating current (AC) power converter.

The I/O ports 16 may enable the electronic device 10 to interface with various other electronic devices. The input devices 14 may enable a user to interact with the electronic device 10. For example, the input devices 14 may include buttons, keyboards, mice, trackpads, and the like. Additionally or alternatively, the electronic display 12 may include touch-sensing components that enable user inputs to the electronic device 10 by detecting the occurrence and/or position of an object touching its screen (e.g., surface of the electronic display 12).

The electronic display 12 may display a graphical user interface (GUI) (e.g., of an operating system or computer program), an application interface, text, a still image, and/or video content. The electronic display 12 may include a display panel with one or more display pixels to facilitate displaying images. Additionally, each display pixel may represent one of the sub-pixels that control the luminance of a color component (e.g., red, green, or blue). Although sometimes used to refer to a collection of sub-pixels (e.g., red, green, and blue subpixels) as used herein, the terms display pixel or pixel may refer to an individual sub-pixel (e.g., red, green, or blue subpixel).

As described above, the electronic display 12 may display an image by controlling the luminance output (e.g., light emission) of the sub-pixels based on corresponding image data. In some embodiments, pixel or image data may be generated by an image source, such as the processor core complex 18, a graphics processing unit (GPU), or an image sensor (e.g., camera). Additionally, in some embodiments, image data may be received from another electronic device 10, for example, via the network interface 24 and/or an I/O port 16. Moreover, in some embodiments, the electronic device 10 may include multiple electronic displays 12 and/or may perform image processing (e.g., via the image processing circuitry) for one or more external electronic displays 12, such as connected via the network interface 24 and/or the I/O ports 16.

Figure 2:
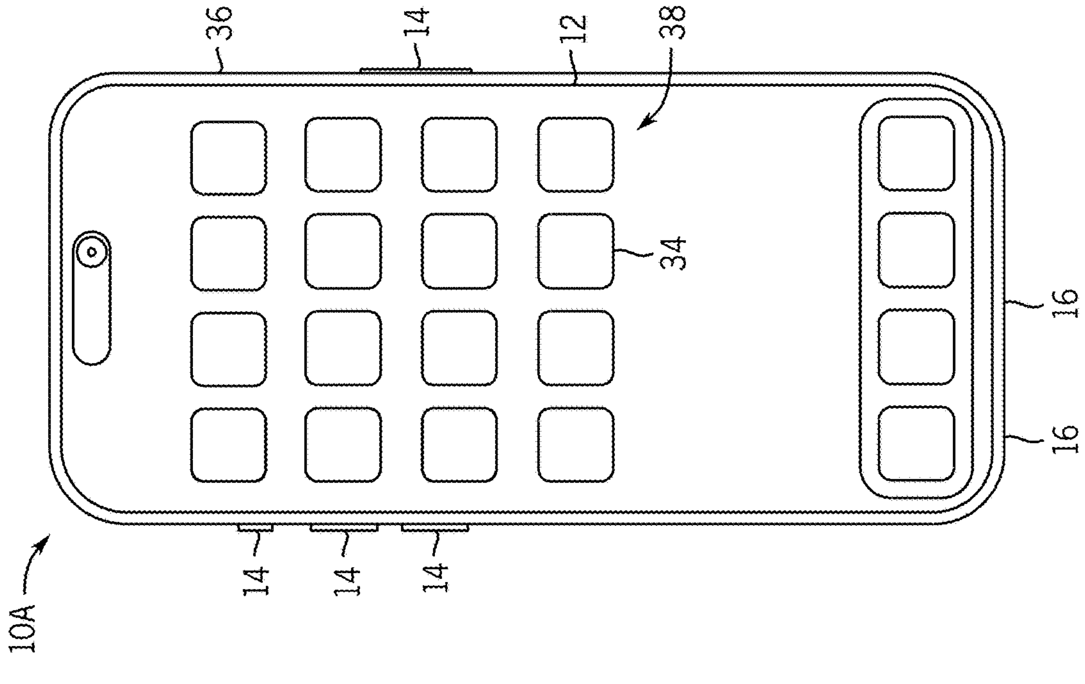
FIG. 2 is an example of the electronic device of FIG. 1 in the form of a handheld device, in accordance with an embodiment.

The electronic device 10 may be any suitable electronic device. To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For illustrative purposes, the handheld device 10A may be a smartphone, such as an IPHONE® model available from Apple Inc.

The handheld device 10A may include an enclosure 36 (e.g., housing) to, for example, protect interior components from physical damage and/or shield them from electromagnetic interference. The enclosure 36 may surround, at least partially, the electronic display 12. In the depicted embodiment, the electronic display 12 is displaying a graphical user interface (GUI) 38 having an array of icons 34. By way of example, when an icon 34 is selected either by an input device 14 or a touch-sensing component of the electronic display 12, an application program may launch.

Input devices 14 may be accessed through openings in the enclosure 36. Moreover, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. Moreover, the I/O ports 16 may also open through the enclosure 36. Additionally, the electronic device may include one or more cameras to capture pictures or video. In some embodiments, a camera may be used in conjunction with a virtual reality or augmented reality visualization on the electronic display 12.

Figure 3:
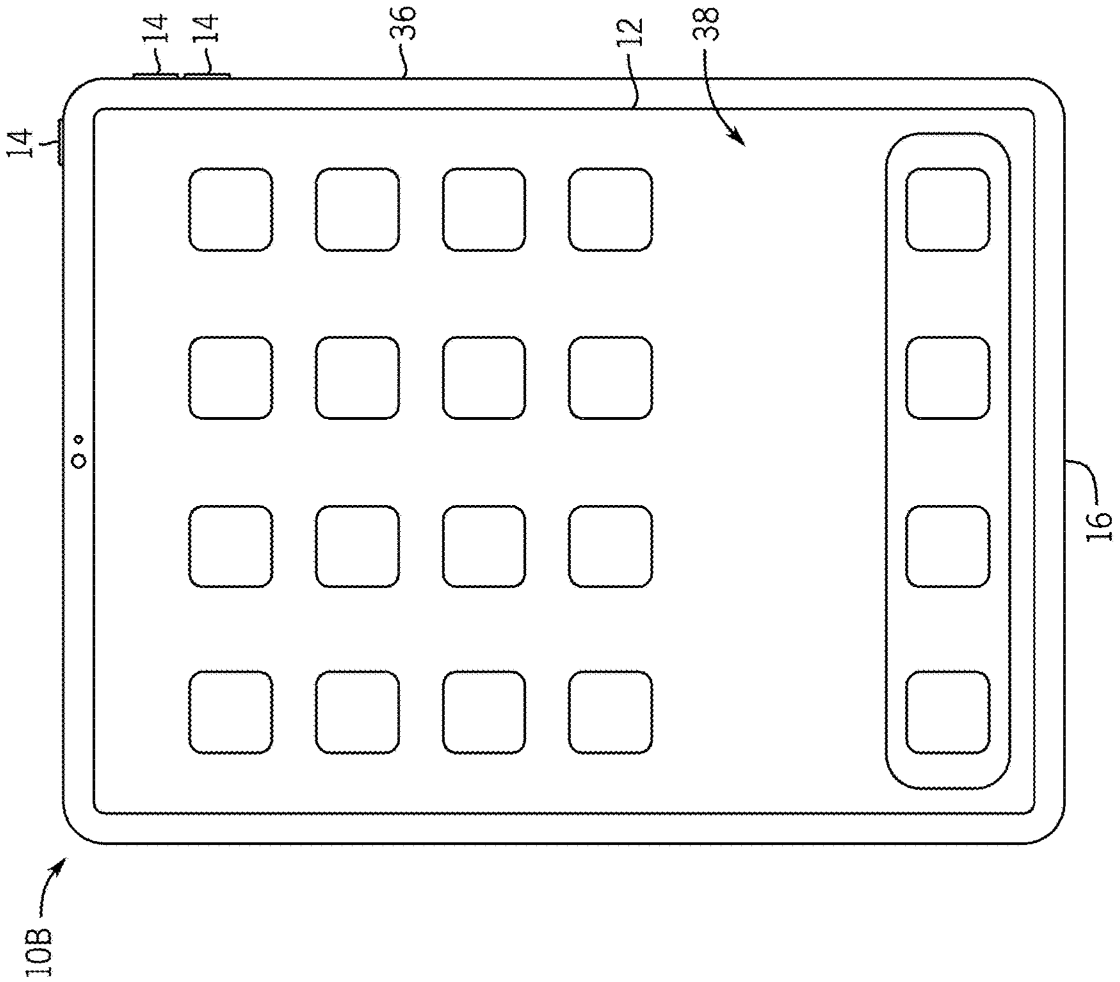
FIG. 3 is another example of the electronic device of FIG. 1 in the form of a tablet device, in accordance with an embodiment.
Figure 4:
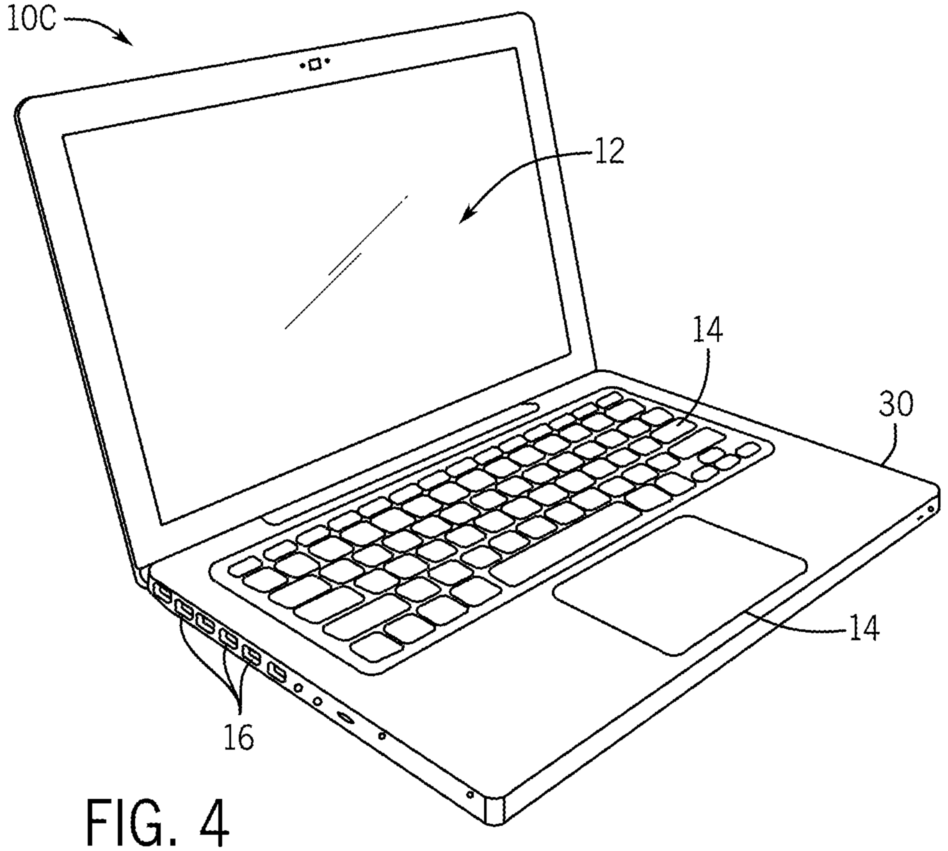
FIG. 4 is another example of the electronic device of FIG. 1 in the form of a computer, in accordance with an embodiment.
Figure 5:
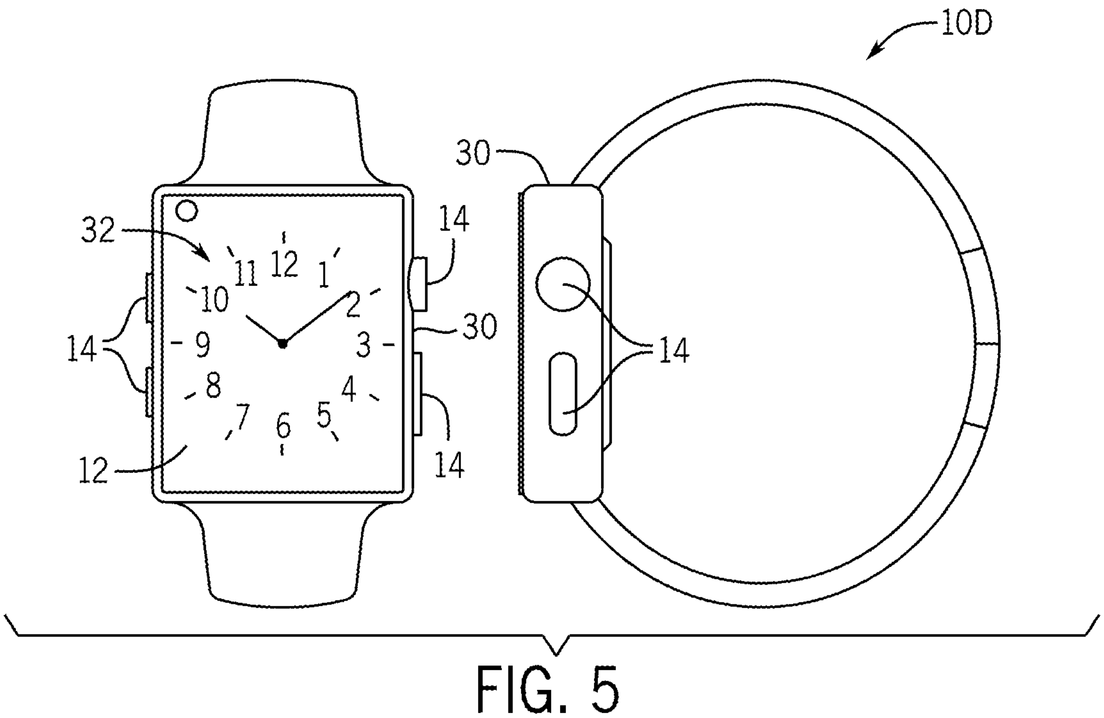
FIG. 5 is another example of the electronic device of FIG. 1 in the form of a watch, in accordance with an embodiment.

Another example of a suitable electronic device 10, specifically a tablet device 10B, is shown in FIG. 3. The tablet device 10B may be any IPAD® model available from Apple Inc. A further example of a suitable electronic device 10, specifically a computer 10C (e.g., notebook computer), is shown in FIG. 4. By way of example, the computer 10C may be any MACBOOK® model available from Apple Inc. Another example of a suitable electronic device 10 (e.g., a worn device), specifically a watch 10D, is shown in FIG. 5. By way of example, the watch 10D may be any APPLE WATCH® model available from Apple Inc. As depicted, the tablet device 10B, the computer 10C, and the watch 10D each also includes an electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed with respect to FIGS. 2 and 3.

Figure 6:
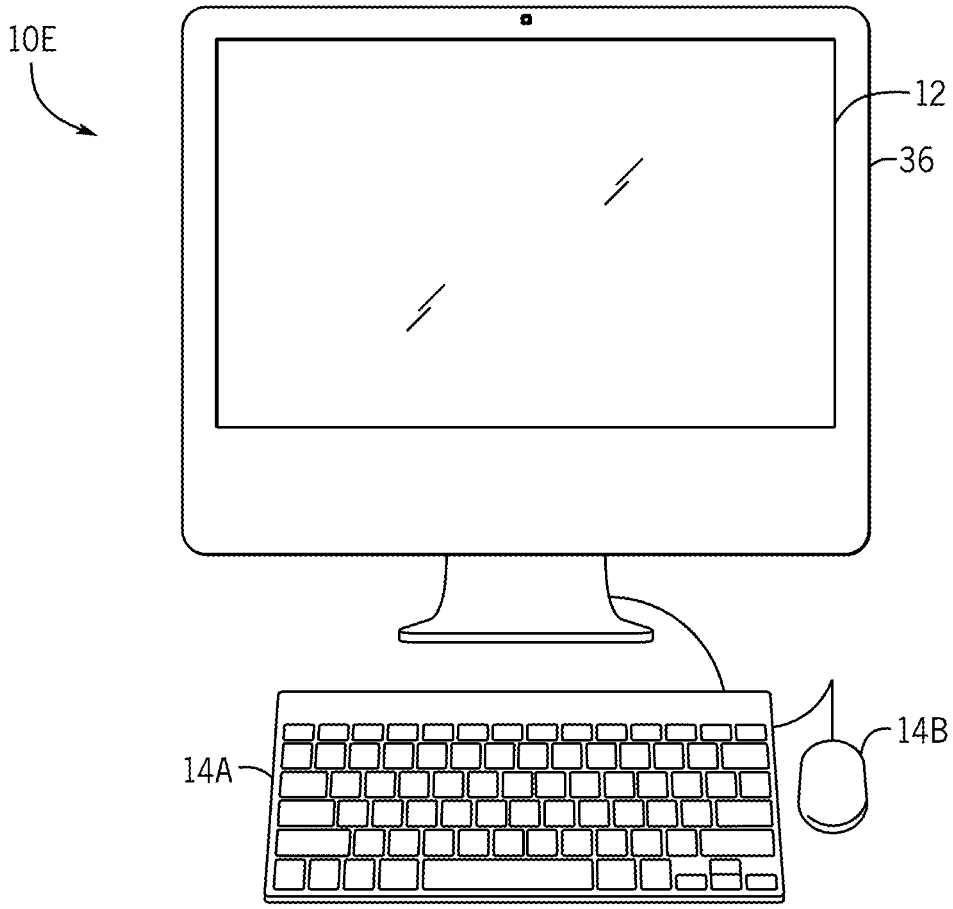
FIG. 6 is another example of the electronic device of FIG. 1 in the form of a computer, in accordance with an embodiment.

Turning to FIG. 6, a computer 10E may represent another embodiment of the electronic device 10 of FIG. 1. The computer 10E may be any suitable computer, such as a desktop computer or a server, but may also be a standalone media player or video gaming machine. By way of example, the computer 10E may be an IMAC® or other device by Apple Inc. of Cupertino, California. It should be noted that the computer 10E may also represent a personal computer (PC) by another manufacturer. A similar enclosure 36 may be provided to protect and enclose internal components of the computer 10E, such as the electronic display 12. In certain embodiments, a user of the computer 10E may interact with the computer 10E using various peripheral input devices 14, such as a keyboard 14A or mouse 14B, which may connect to the computer 10E.

Figure 7:
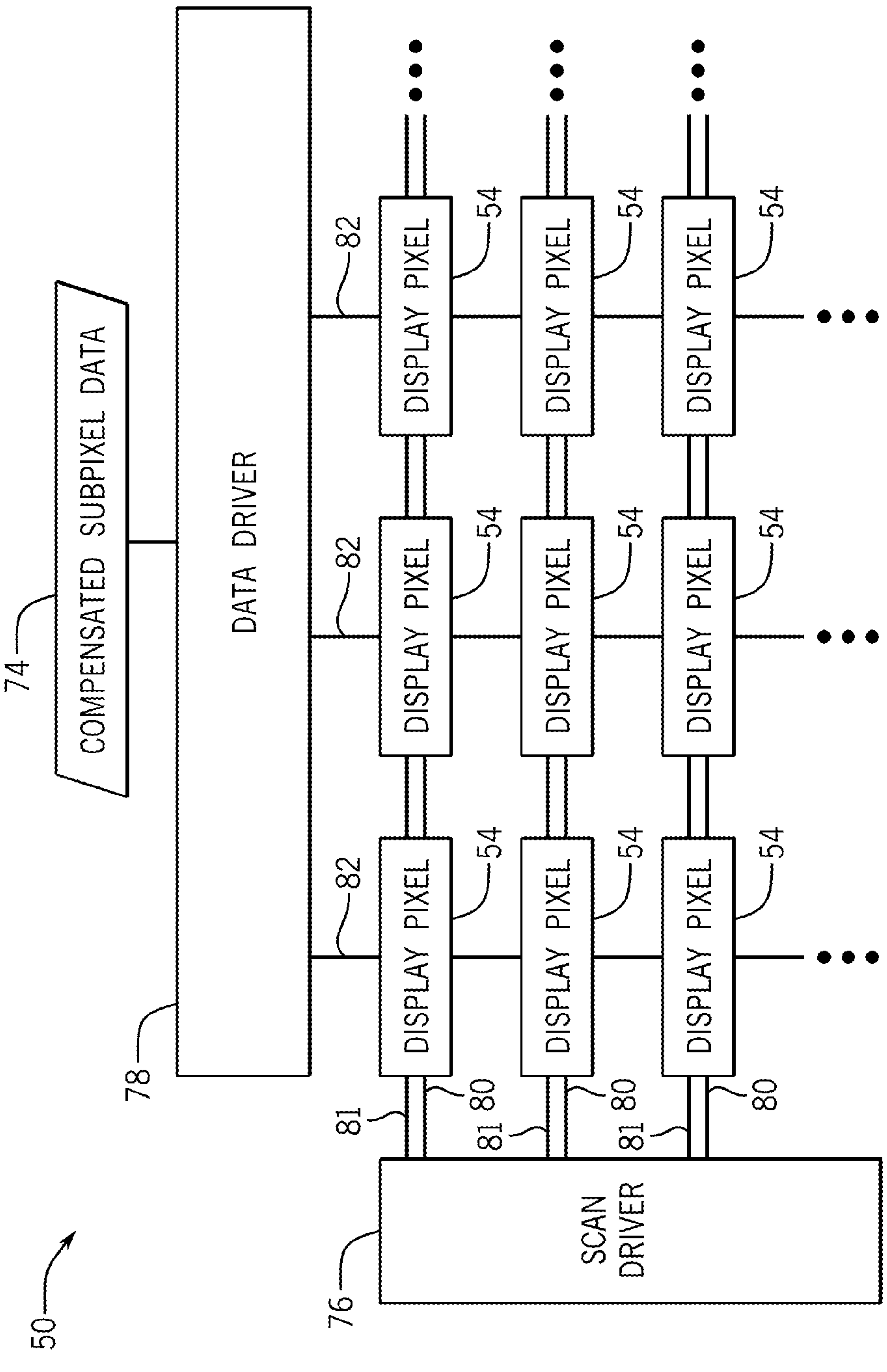
FIG. 7 is a block diagram of a display pixel array of the electronic display of FIG. 1, in accordance with an embodiment.

FIG. 7 is a block diagram of a display pixel array 50 of the electronic display 12. It should be understood that, in an actual implementation, additional or fewer components may be included in the display pixel array 50. The electronic display 12 may receive compensated subpixel data 74 for presentation on the electronic display 12. The electronic display 12 includes display driver circuitry that includes scan driver circuitry 76 and data driver circuitry 78. The display driver circuitry controls programming the compensated subpixel data 74 into the display pixels 54 for presentation of an image frame via light emitted according to each respective bit of compensated pixel data 74 programmed into one or more of the display pixels 54.

The display pixels 54 may each include one or more self-emissive elements, such as a light-emitting diodes (LEDs) (e.g., organic light emitting diodes (OLEDs) or micro-LEDs (μLEDs)), however other pixels may be used with the systems and methods described herein including but not limited to liquid-crystal devices (LCDs), digital mirror devices (DMD), or the like, and include use of displays that use different driving methods than those described herein, including partial image frame presentation modes, variable refresh rate modes, or the like.

Different display pixels 54 may emit different colors. For example, some of the display pixels 54 may emit red light, some may emit green light, and some may emit blue light. Thus, the display pixels 54 may be driven to emit light at different brightness levels to cause a user viewing the electronic display 12 to perceive an image formed from different colors of light. The display pixels 54 may also correspond to hue and/or luminance levels of a color to be emitted and/or to alternative color combinations, such as combinations that use red (R), green (G), blue (B), or others.

The scan driver circuitry 76 may provide scan signals (e.g., pixel reset, data enable, on-bias stress) on scan lines 80 to control the display pixels 54 by row. For example, the scan driver circuitry 76 may cause a row of the display pixels 54 to become enabled to receive a portion of the compensated subpixel data 74 from data lines 82 from the data driver circuitry 78. A sampling signal may be applied on sampling lines 81. In this way, an image frame of the compensated subpixel data 74 may be programmed onto the display pixels 54 row-by-row. Other examples of the electronic display 12 may program the display pixels 54 in groups other than by row. For example, the sampling signal may be applied on the sampling lines 81 row-by-row, while the scan signal applied on the scan lines 80 may be applied on groups of two rows (e.g., a 2H scan signal), groups of three rows (e.g., a 3H scan signal), or groups including any appropriate number of rows.

Figure 8:
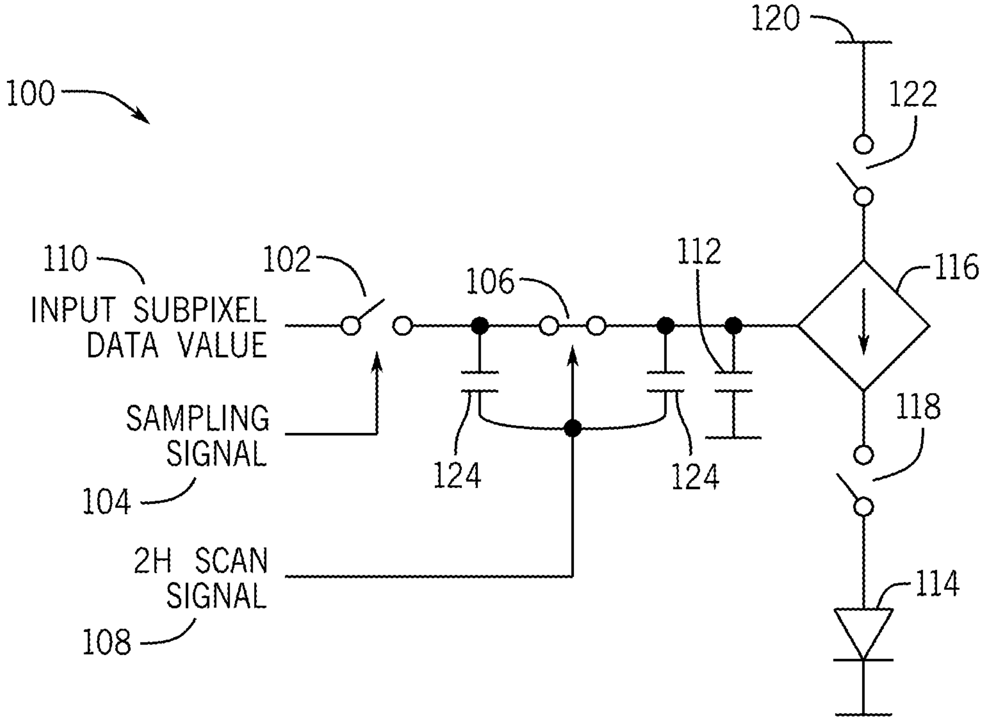
FIG. 8 is a schematic diagram of a pixel driving circuit.

FIG. 8 is a schematic diagram of a pixel driving circuit 100. The pixel driving circuit comprises a sampling switch 102 that may open or close based on a sampling signal 104 and a scan switch 106 that may open or close based on a scan signal 108. An input subpixel data value 110 may be stored in a storage capacitor 112 based on the sampling signal 104 and the scan signal 108. The pixel driving circuitry includes a light-emitting diode (LED) 114 (e.g., such an organic LED (OLED)), a current source 116, and a switch 118 that may couple the current source 116 to the LED 114. The pixel driving circuit 100 includes supply voltage (Vdd) 120, and a switch 122 coupling the supply voltage 120 and the current source 116. The input subpixel data value 110 may include a gray value or could be a digital voltage value that may be converted to a gray value before being sent to the electronic display 12. A gray value is a digital value used to specify intensity or level of gray in a particular display pixel 54. For example, if the image data includes 8-bit image data, the gray level may include a range of 0-255.

The sampling signal 104 may activate (close) or deactivate (open) the sampling switch 102, causing the sampling switch 102 to sample the input subpixel data value 110. Sampling the input subpixel data value 110 may cause the input subpixel data value 110 to be stored on a particular display pixel 54. The input image data value 110 that is stored in each display pixel 54 affects the amount of light (e.g., intensity, luminance, brightness) emitted by those respective display pixels 54 of the electronic display 12. By varying the amount of light emitted by different display pixels 54 of different colors (e.g., red, green, or blue), a vast number of different colors may be generated by the electronic display 12. The scan signal 108 may activate (close) or deactivate (open) the scan switch 106, causing the scan switch 106 to sample a non-ideality of a transistor (e.g., a thin-film transistor) of pixel circuitry and sample input data voltage.

As previously mentioned, when subpixels are driven by scan signals (including a 2H scan signal) while input value is programmed line-by-line, luminance mismatch between the subpixels on odd and even rows can occur, even if the input values (e.g., the input subpixel data value 110) is identical for the odd and even row. In particular, voltage ripple associated with the scan signal 108 may be capacitively coupled (via parasitic capacitances 124) and sampled to subpixels on odd and even rows at different timings, as will be discussed in greater detail below. The parasitic capacitances 124 may impact a data voltage value stored on the storage capacitor 112, which may result in front-of-screen luminance distortion.

Figure 9:
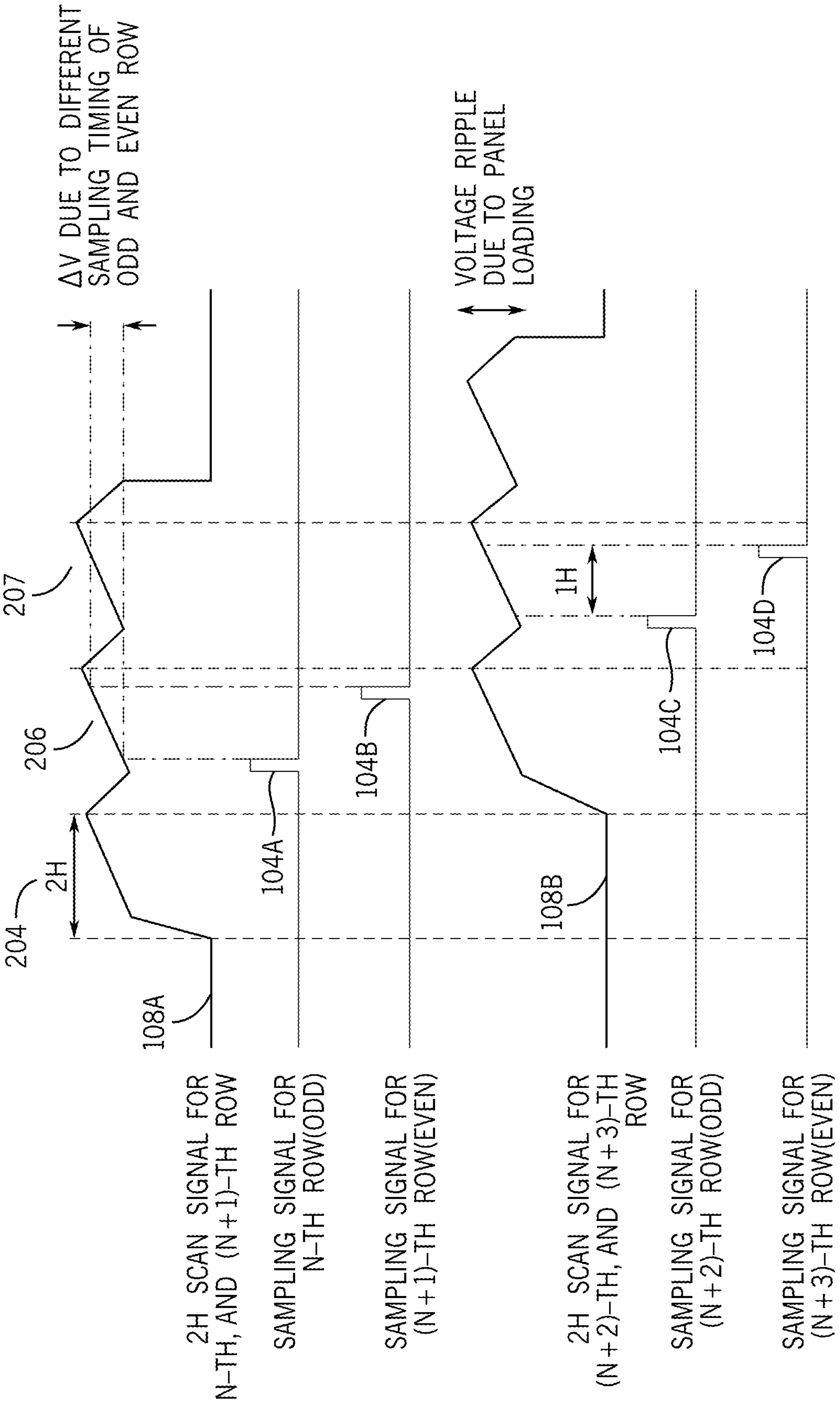
FIG. 9 is a diagram illustrating voltage mismatch between odd rows of pixels and even rows of pixels in the electronic display of FIG. 1, in accordance with an embodiment.

FIG. 9 is a diagram illustrating voltage mismatch between odd rows of pixels and even rows of pixels in the electronic display 12, according to embodiments of the present disclosure. As may be observed, a scan signal 108A may experience voltage ripple within a period 204, such as a 2H scan signal period. The voltage ripple of the scan signal may result from loading non-ideality of the panel of the electronic display 12. The voltage ripple may cause amplitude variations of the scan signal 108A. The intensity of the voltage ripple may change proportionally to distance from a voltage supply and may change based on the impedance of the panel.

A 2H scan signal may indicate that the scan signals are staged with a 2H (two-line time) delay every two rows. The 2H scan signal may be shared by a pair of adjacent odd and even rows. For example, a display pixel 54 of an Nth row (odd row) and a display pixel 54 of a N+1 row (even row) may share the scan signal 108A. For example, odd row sampling signal 104A and even row sampling signal 104B may each correspond to a period 206 of the scan signal 108A. As may be observed, the amplitude of the scan signal corresponding to the sampling signal 104A is different from the amplitude of the scan signal corresponding to the sampling signal 104B, as the sampling signal 104A and the sampling signal 104B do not occur simultaneously. The difference in the scan signal amplitude during the sampling signal 104A and the sampling signal 104B may cause luminance mismatch between the display pixels 54 of the Nth row and the N+1 row. As previously mentioned, luminance mismatches may cause front-of-screen distortions on the electronic display 12 and may negatively impact user experience.

Additionally or alternatively, odd-even row mismatch may occur on scan signals other than 2H scan signals (e.g., within scan signals with larger or smaller periods). As may be observed, a scan signal 108B may experience voltage ripple within the period 206 and a period 207. Similar to the scan signal 108A discussed above, voltage ripple of the scan signal 108B may result from panel loading non-ideality of the panel of the electronic display 12. The voltage ripple may cause amplitude variations of the scan signal 108B. The intensity of the voltage ripple may change proportionally to distance from a voltage supply and may change based on impedance of the panel. The scan signal 108B may be shared by a pair of adjacent odd and even rows. For example, a display pixel 54 of an N+2 row (odd row) and a display pixel 54 of an N+3 row (even row) may share the scan signal 108B. As may be observed, odd row sampling signal 104C and even row sampling signal 104D may each correspond to the period 207 of the scan signal 108B.

As may be observed, the amplitude of the scan signal 108B at a time corresponding to activation of the sampling signal 104C (e.g., via closing the sampling switch 102) is different from the amplitude of the scan signal at a time corresponding to activation of the sampling signal 104D (e.g., via closing the sampling switch 102) as the sampling signal 104C and the sampling signal 104D do not occur simultaneously, but occur at a 1H offset within the 2H period. The difference in the scan signal amplitude during the 1H offset—that is, during activation of the sampling signal 104C and the sampling signal 104D—may cause luminance mismatch between the display pixels 54 of the N+2 row and the N+3 row. As previously mentioned, luminance mismatches may cause front-of-screen distortions on the electronic display 12 and may negatively impact user experience. To compensate for the luminance mismatches between adjacent rows that share the same scan signal, mismatch compensation circuitry may be implemented to mitigate or eliminate the luminance mismatch.

Figure 10:
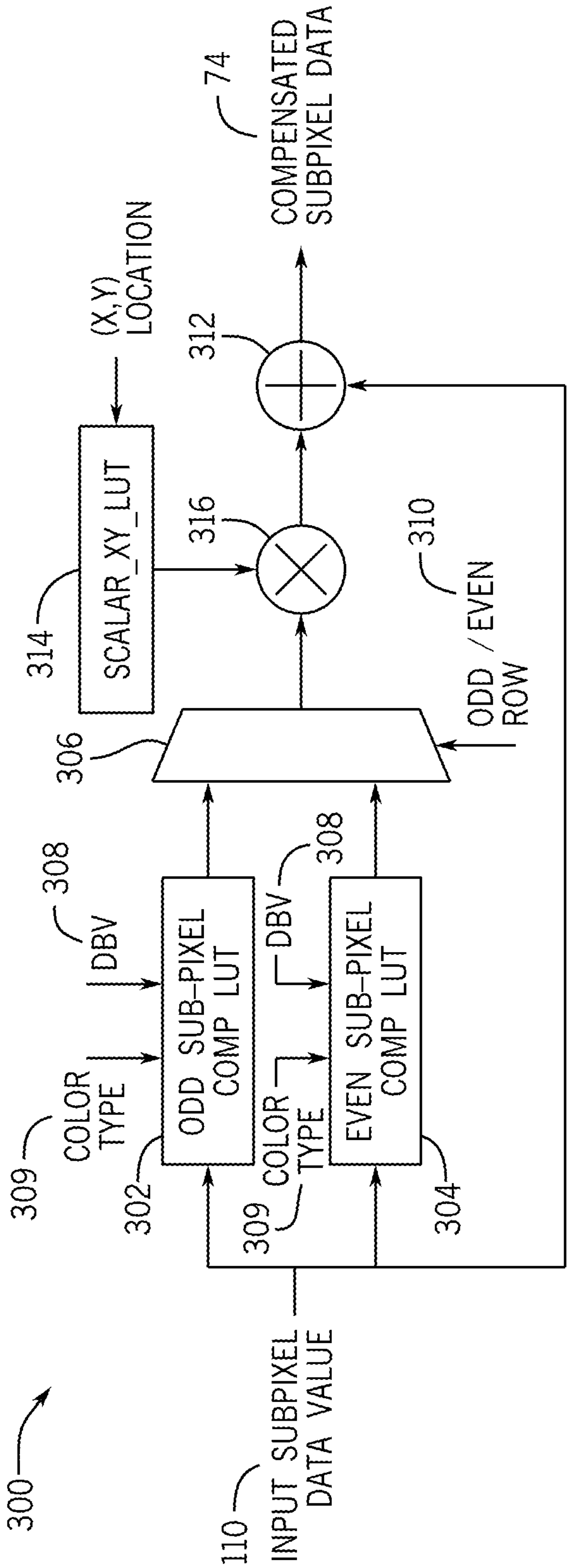
FIG. 10 is a schematic diagram of mismatch compensation circuitry that may reduce or eliminate the voltage mismatch illustrated in FIG. 9, in accordance with an embodiment.

FIG. 10 is a schematic diagram of mismatch compensation circuitry 300, according to embodiments of the present disclosure. The mismatch compensation circuitry may be disposed in the display driver integrated circuit (DDIC) of the electronic device 10 or the processor core complex 18. The mismatch compensation circuitry 300 includes an odd subpixel compensation lookup table (LUT) 302 coupled to a first input of a multiplexer 306, and an even subpixel compensation LUT 304 coupled to a second input of the multiplexer 306. The odd subpixel compensation LUT 302 may be preloaded with digital compensation values for subpixels in an odd row of the electronic display 12 (e.g., the Nth row and N+2 row). The particular compensation value selected by the odd subpixel compensation LUT 302 may be selected based on the input subpixel data value 110, the color type 309 of the display pixel 54, and the display brightness value (DBV) 308 of the electronic display 12. The even subpixel compensation LUT 304 may be preloaded with digital compensation values for subpixels in an even row of the electronic display 12 (e.g., the N+1 row and N+3 row). The multiplexer 306 may select an odd subpixel compensation from the odd subpixel compensation LUT 302 or may select an even subpixel compensation from the even subpixel compensation LUT 304 based on a select signal 310. The multiplexer 306 may output the odd subpixel compensation value or the even subpixel compensation value and, at the adder circuitry 312, combine the input subpixel data value 110 with the input subpixel data value 110 to generate compensated subpixel data 74.

The odd subpixel compensation values and even subpixel compensation values may be selected and combined with the input subpixel data value 110 on adjacent clock cycles. For example, the multiplexer 306 may receive an odd subpixel compensation value from the odd subpixel compensation LUT 302, and output the odd subpixel compensation value to the adder circuitry 312 on a first clock cycle to generate compensated odd subpixel image data. The multiplexer may receive an even subpixel compensation value from the even subpixel compensation LUT 304, and output the even subpixel compensation value to the adder circuitry 312 on a second clock cycle to generate compensated odd subpixel image data. In this manner, the odd subpixel compensation LUT 302, the even subpixel compensation LUT 304, and the multiplexer 306 may compensate for mismatch due to the timing mismatch and voltage ripple associated with the scan signals and sampling signals of pixel driving circuitry. The digital compensation values (i.e., the even subpixel compensation value and/or the odd subpixel compensation value) may include a digital value of a voltage value. That is, the compensation may be applied in the digital domain (adjusting the gray value) and converted to a corresponding voltage value to be programmed into the display pixels 54.

In some instances, the impact of the voltage ripple on the scan signals (e.g., 108A and/or 108B) may vary based on the location of a subpixel relative to a voltage source. Accordingly, a subpixel location compensation LUT 314 may store pre-loaded compensation values based on a subpixel's (x, y) coordinates on a display panel of the electronic display. Accordingly, in some embodiments, the odd subpixel compensation value and the even subpixel compensation value may be combined with a location-based scaler compensation value output by the subpixel location compensation LUT 314 prior to being output to the electronic display. The subpixel location compensation LUT 314 may receive the (x, y) coordinates of a particular subpixel (e.g., or the (x, y) coordinates of a particular pixel including the particular subpixel) and output the location-based scaler compensation value into combiner circuitry 316 (e.g., multiplication circuitry).

At the combiner circuitry 316, the location-based scaler compensation value may be combined with the even or odd subpixel compensation value to generate a compensation value that compensates both for the odd row-even row luminance mismatch and for location-based mismatch variability. For example, the location-based scaler may be combined with the odd subpixel compensation value when the odd subpixel compensation value is output from the multiplexer 306 during a first clock cycle, and the location-based scaler may be combined with the even subpixel compensation value when the even subpixel compensation value is output from the multiplexer 306 during a second clock cycle. In this manner, the location-based scaler compensation value may be applied to accommodate subpixel location dependency of the panel loading and further compensate the input subpixel data value 110. It should be noted that the pre-loaded compensation value may be based on empirical measurements of the electronic display 12 or a bin of electronic displays 12. That is, each electronic display 12 may be measured to determine the location-based impact of the voltage ripple, or a common set of pre-loaded compensation values may be dispatched to a group of electronic displays 12.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. An electronic device, comprising:
- an electronic display; and
- processing circuitry configured to:
  - receive image data comprising first subpixel data corresponding to a display subpixel of a first row and second subpixel data corresponding to a display subpixel of a second row;
  - apply a first subpixel compensation value to the first subpixel data to generate first compensated subpixel data configured to compensate for a data voltage mismatch between the first row and the second row due to fluctuations of a scan signal when the image data is to be sampled in the first row as compared to the second row;
  - apply a second subpixel compensation value to the second subpixel data to generate second compensated subpixel data configured to compensate for the data voltage mismatch between the first row and the second row due to the fluctuations of the scan signal when the image data is to be sampled in the second row as compared to the first row;
  - apply a third subpixel compensation value to the first compensated subpixel data in a first clock cycle to generate first adjusted subpixel data and apply a fourth subpixel compensation value to the second compensated subpixel data in a second clock cycle, wherein the third subpixel compensation value is based on a location of the display subpixel of the first row with respect to a voltage source of the electronic display, and wherein the fourth subpixel compensation value is based on a location of the display subpixel of the second row with respect to the voltage source; and
  - output the first adjusted subpixel data and the second adjusted subpixel data to the electronic display.

2. The electronic device of claim 1, where in the processing circuitry is configured to apply a third subpixel compensation value to the image data, wherein the third subpixel compensation value is based on a location of a respective display subpixel with respect to a voltage source of the electronic display.

3. The electronic device of claim 2, wherein the third subpixel compensation value is output by a subpixel location lookup table (LUT) configured to output the third subpixel compensation value based on the location of the respective subpixel with respect to the voltage source.

4. The electronic device of claim 3, wherein the subpixel location LUT is configured to output the third subpixel compensation value to combiner circuitry configured to combine the third subpixel compensation value with the first subpixel compensation value in a first clock cycle.

5. The electronic device of claim 2, wherein the third subpixel compensation value is configured to compensate for location-dependent voltage ripple variations, wherein the location-dependent voltage ripple variations are based on the location of the respective subpixel with respect to the voltage source of the electronic display.

6. The electronic device of claim 1, wherein the processing circuitry is configured to:
- apply the first subpixel compensation value to the image data to generate the first compensated subpixel data based on a display brightness value of the electronic display; and
- apply the second subpixel compensation value to the image data to generate the second compensated subpixel data based on the display brightness value of the electronic display.

7. The electronic device of claim 1, wherein the first row comprises an odd row and the second row comprises an even row.

8. The electronic device of claim 1, wherein the image data comprises third subpixel data corresponding to a display pixel of a third row, and wherein the processing circuitry is configured to apply a third subpixel compensation value to the third subpixel data to generate third compensated subpixel data configured to compensate for the data voltage mismatch between the first row, the second row, and the third row due to the fluctuations of the scan signal when the image data is to be sampled in the third row as compared to the first row and the second row.

9. The electronic device of claim 1, wherein the third subpixel compensation value and the fourth subpixel compensation value are to have a same value, are to be based on a location of a pixel associated with the display subpixel of the first row and with the display subpixel of the second row, or both.

10. Subpixel data mismatch compensation circuitry, comprising:
- a multiplexer;
- a first lookup table (LUT) comprising a first set of subpixel compensation values for a first row of display pixels and configured to output a first subpixel compensation value of the first set of subpixel compensation values to a first input of the multiplexer;
- a second LUT comprising a second set of subpixel compensation values for a second row of display pixels and configured to output a second subpixel compensation value of the second set of subpixel compensation values to a second input of the multiplexer;
- a third LUT configured to output a third subpixel compensation value based on a location of a subpixel of an electronic display; and
- multiplication circuitry configured to combine the third subpixel compensation value with the first subpixel compensation value or the second subpixel compensation value to generate a compensation value.

11. The subpixel data mismatch compensation circuitry of claim 10, wherein the first LUT is configured to output the first subpixel compensation value of the first set of subpixel compensation values based on input image data, a display brightness value, or both.

12. The subpixel data mismatch compensation circuitry of claim 10, wherein the second LUT is configured to output the second subpixel compensation value of the second set of subpixel compensation values based on input image data, a display brightness value, or both.

13. The subpixel data mismatch compensation circuitry of claim 10, wherein the multiplication circuitry is configured to output the compensation value to adder circuitry, the adder circuitry configured to combine the compensation value with input image data to generate compensated input image data.

14. The subpixel data mismatch compensation circuitry of claim 13, wherein the adder circuitry is configured to output the compensated input image data to the electronic display to compensate for data voltage mismatch between the first row of display pixels and the second row of display pixels due to a scan signal generating a parasitic capacitance on a data voltage value stored on a storage capacitor of a subpixel of the electronic display.

15. The subpixel data mismatch compensation circuitry of claim 10, wherein the third subpixel compensation value is selected based on a location of a pixel associated with the location of the subpixel.

16. The subpixel data mismatch compensation circuitry of claim 10, wherein the multiplication circuitry is configured to combine the third subpixel compensation value with the first subpixel compensation value when the location of the subpixel is in an odd row of the electronic display.

17. Tangible, non-transitory, computer-readable media comprising instructions that, when executed by one or more processors, cause the one or more processors to:

receive input image data comprising first subpixel data corresponding to a display pixel of a first row and second subpixel data corresponding to a display pixel of a second row;

cause a first lookup table (LUT) to output a first compensation value to a multiplexer;

cause a second LUT to output a second compensation value to the multiplexer; and cause the multiplexer to output the first compensation value or the second compensation value to combiner circuitry, the combiner circuitry configured to:

combine the first compensation value with the first subpixel data to generate first compensated subpixel data, or combine the second compensation value with the second subpixel data to generate second compensated subpixel data; and output the first compensated subpixel data or the second compensated subpixel data to an electronic display.

18. The tangible, non-transitory, computer-readable media of claim 17, wherein the instructions cause the one or more processors to:

cause a third LUT to output a third compensation value to second combiner circuitry, the third compensation value configured to compensate for location-dependent voltage ripple on the electronic display by combining the third compensation value with the first compensation value or the second compensation value to generate third compensated subpixel data.

19. The tangible, non-transitory, computer-readable media of claim 17, wherein the first LUT is configured to output the first compensation value based on the input image data and a display brightness value of the electronic display.

20. The tangible, non-transitory, computer-readable media of claim 17, wherein the second LUT is configured to output the second compensation value based on the input image data and a display brightness value of the electronic display.

* * * * *